United States Patent
Mochizuki et al.

(10) Patent No.: US 6,633,521 B1
(45) Date of Patent: Oct. 14, 2003

(54) STORAGE APPARATUS AND SERVO RECOVERY METHOD OF IT

(75) Inventors: Hideshi Mochizuki, Kawasaki (JP); Toru Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/497,350

(22) Filed: Feb. 3, 2000

(30) Foreign Application Priority Data

Aug. 27, 1999 (JP) .............................. 11-242063

(51) Int. Cl.[7] .............................. G06F 11/00
(52) U.S. Cl. .............. 369/44.29; 360/77.04; 714/2; 711/4; 711/112
(58) Field of Search ............ 369/44.29; 360/77.04; 714/2; 711/4, 112

(56) References Cited

U.S. PATENT DOCUMENTS

| | | | | |
|---|---|---|---|---|
| 4,937,688 A | * | 6/1990 | Sengoku | 360/69 |
| 5,163,162 A | * | 11/1992 | Berry et al. | 369/43 |
| 5,274,646 A | * | 12/1993 | Brey et al. | 371/40.1 |
| 5,812,752 A | * | 9/1998 | Yamada | 395/182.03 |
| 5,898,532 A | * | 4/1999 | Du et al. | 360/46 |
| 5,918,001 A | * | 6/1999 | Ueno et al. | 395/182.06 |
| 5,995,317 A | * | 11/1999 | Ottesen | 360/77.04 |
| 6,061,805 A | * | 5/2000 | Suzuki et al. | 714/2 |
| 6,470,412 B1 | * | 10/2002 | Kisaka et al. | 711/4 |

FOREIGN PATENT DOCUMENTS

| | | |
|---|---|---|
| JP | 2235220 | 9/1990 |
| JP | 8180621 | 7/1996 |
| JP | 11185211 | 7/1999 |

* cited by examiner

Primary Examiner—Doris H. To
Assistant Examiner—Gautam R. Patel
(74) Attorney, Agent, or Firm—Gree, Burns & Crain, Ltd.

(57) ABSTRACT

The present invention relates to a storage device and a servo recovery method for the storage device, which restores the head to a track when the head goes off from the track of a storage medium, and whereby it prevents the servo recovery process from being continuously called over a short period of time. The storage device comprises a storage medium, a head and a control circuit which performs the servo recovery process. The servo recovery process, having multiple recovery processes, is called up when off track is detected. The frequency that the recovery process is called up is detected, and one of the multiple recovery processes is executed according to the detected call-up frequency. A different recovery process is performed when the call-up frequency is high, therefore this recovery process makes it possible to prevent frequent occurrence of the off-track state.

16 Claims, 14 Drawing Sheets

Servo Recovery

Go Home Level 1

Go Home Level 2

TES Measuring

FIG. 12
| Recovery Counter N1 | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | ↓ | ↓ | ↓ | ↓ | ↓ | ↓ | ↓ | ↓ | ↓ | ↓ | ↓ | ↓ | ↓ | ↓ | ↓ | ↓ |
| Recovery Level | 0 | 0 | 0 | 1 | 0 | 0 | 0 | 2 | 0 | 0 | 0 | 1 | 0 | 0 | 0 | 2 |
FIG. 13A
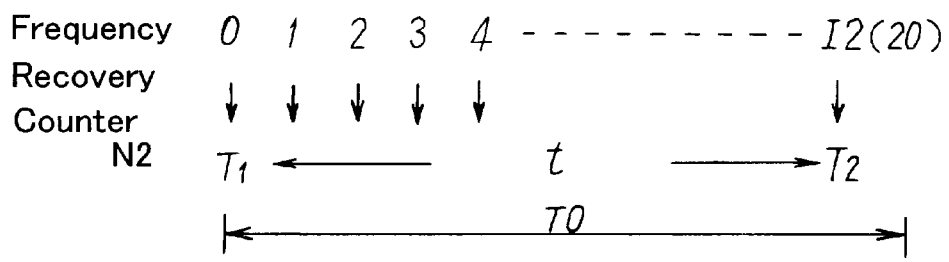
FIG. 13B
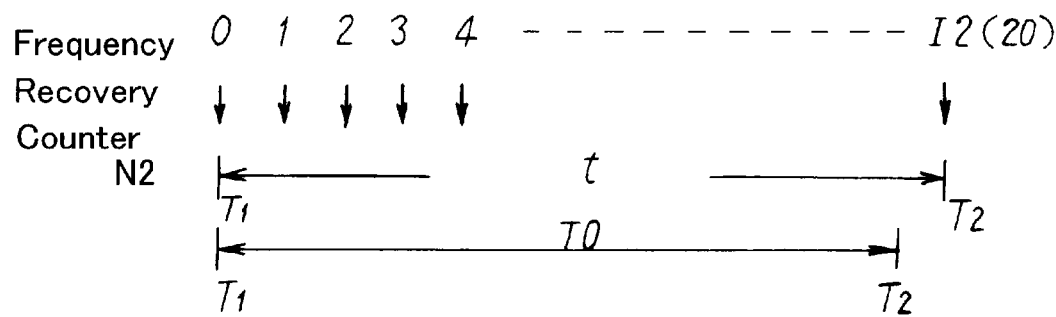

STORAGE APPARATUS AND SERVO RECOVERY METHOD OF IT

BACKGROUND OF THE INVENTION

1. Field of the Invention

The present invention relates to a storage apparatus having a head for reading data from a track on a storage medium, and to a servo recovery method, and more particularly to the storage apparatus and servo recovery method for detecting when the head goes off track, and restoring the head to the track.

2. Description of the Related Art

Data storage devices which use storage medium and a head have been widely used. Magnetic storage devices uses a magnetic medium as the storage medium, and optical storage devices uses optical medium as the medium. In these kinds of data storage devices, after the head is positioned on the track of the storage medium, it reads and writes data from or to the track. In order to perform this reading or writing, the head must follow the track.

A servo control unit is used in order to follow the head to the track. This servo control unit detects the head position from the signal read from the head, and performs following control to follow the head to the track. The track following control is explained using an example of a magneto-optical storage device which is used as an external storage device for a computer.

In a magneto-optical storage device, a magneto-optical medium is used as the data storage unit. This medium has a storage layer made from a magnetic material that is formed on top of a substrate. This medium takes advantage of the heat from a light and the change in magnetic field to store information. This medium is formed with a data track for recording and reproducing data. Generally, there is a groove (tracking grooves) formed in a spiral shape on the substrate of the medium. The track for recording or reproducing data is provided on the land that is located between grooves.

The light beam from an optical head tracks this track. In addition, when recording, the heat applied from the light and the change in magnetic field is used in recording information. Moreover, when reproducing the information, the magneto-optical effect is used to reproduce the information from the reflected light of the light beam. In order to record or reproduce information, the laser beam from a laser diode passes through the objective lens of the optical head, and concentrates on the surface of the medium (recording surface). It is necessary to maintain this concentrated state and to constantly maintain a just focused state. The control needed to do this is called focus servo control.

Moreover, in order to record or reproduce data on the data track described above, the laser beam in the just-focused state must follow the data track. The following control is called track servo control. The optical head generates a track error signal (TES) which indicates the amount of track position deviation from the reflected light. The track servo control generates a track drive signal from this track error signal for doing away with the track position deviation. This track drive signal drives the track actuator, which moves the objective lens of the optical head, in order that the light beam follows the track.

With this kind of light-beam following control, the light beam always follows the track accurately, however there are cases when there are causes for error in the detected track error signal. These causes for error may include, external disturbance (vibration), medium defects, or changes in parameters of the servo circuit. Therefore, an off-track state may occur where the light beam strays off the track.

When the light beam strays off the track and this off-track state occurs, recording or reproducing data becomes difficult. Therefore, when the off-track state is detected, it is necessary to quickly perform a servo recovery process in order to restore the light beam to the track. Normally, the amount of track position deviation appears in the amplitude of the track error signal, so the servo error (off track) is detected by detecting when the track error signal exceeds the off-track slice level. When a servo error is detected (off track is detected), the track servo loop is opened to prevent overrun, as well as the servo recovery process is activated.

Multiple recovery processes have been prepared as the servo recovery process. For example, a first recovery process has been prepared, which is a simple restoration process for restoration to the on-track state in the shortest time, and a second recovery process has been prepared which performs complex restoration processes such as calibration.

Also, as the selection method for selecting the recovery process, selection is made according to the number of retries of the recovery processes. That is, first the first recovery process is executed. If the restoration is not possible with this first recovery process, the second recovery process is executed. This method makes it possible to perform restoration in the shortest amount of time by the first recovery process when off track if the cause of error is not serious (for example; vibration or medium defects). On the other hand, in the case of off track due to serious causes of error (for example; fluctuations in the circuit offset), restoration is possible by the second recovery process.

In other words, in this method, as the cause of off-track error is unknown, first the simple first recovery process is performed, and if restoration in unsuccessful, then recovery is retried with the complex second recovery process.

However, the technology of the prior art had the following problem.

Regardless of the state, when an error occurs in the normal state (on-track state) and the servo recovery process is called, the simple first recovery process is always performed according to the number of recovery tries. Also, if restoration is successful by the first recovery process, the number of recovery tries (recovery counter) is cleared ("0"). The second recovery process is only performed if restoration by the first recovery process failed.

Therefore, after an error occurs and recovery is successful by the first recovery process, there is a possibility that a process which an error occurs again thereby the first recovery process is called may be endlessly repeated.

The reason for this is that there may be an error in the calibration parameters. Normally, the calibration parameters are adjusted to the proper value by performing calibration when the medium is loaded or when a change in temperature occurs. After the calibration process has been performed, it is easy for this phenomenon to occur in the period before the next calibration.

For example, as shown in FIG. 17, control is performed such that the light beam B1 follows the center of the track TRK, however if there is a shift in the offset of the track error signal (TES), control will be performed so that the light beam B2 follows the edge of the track TRK. In this case, following operation becomes unstable, and it is easy for the off-track state to occur by just a little external disturbance.

Moreover, if restoration is successful by the first recovery process, then the on-track state in this unstable state is repeated. Therefore, it is not possible to follow in cases such as external disturbance, eccentricity, or surface deflection, the off-track state is repeated, and the process above of where the first recovery process is repeated many times may occur. The second recovery process should be performed in such a case, however, there was a problem of not being able to effectively use this second recovery process.

SUMMARY OF THE INVENTION

In view of the above problem in the prior art, the objective of the present invention is to provide a storage apparatus and a servo recovery method for the storage device which prevents retrying recovery using the same recovery process.

Another objective of the present invention is to provide a storage apparatus and a servo recovery method for the storage device which executes the proper recovery process by detecting the unstable state of the servo system.

A further objective of the present invention is to provide a storage apparatus and servo recovery method for the storage device which executes the proper recovery process according to the state of the servo system.

Yet a further objective of the present invention is to provide a storage apparatus and servo recovery method for the storage device which executes the proper recovery process according to the error state that occurred.

To perform this object, in the present invention, the storage apparatus comprises a storage medium, head, actuator, and control circuit which executes the servo recovery process for restoring the head to the on-track state after the head has gone off track from the track of the storage medium.

Moreover, the servo recovery method comprises: a step of calling the servo recovery process which has multiple recovery processes with different restoration process levels; a step of detecting a calling frequency that the servo recovery process is called; and a step of selecting and executing one of the multiple recovery processes according to the detected calling frequency.

The present invention is capable of detecting the condition in which the off-track state occurs often, even when the servo recovery process is performed, by checking the calling frequency that the servo recovery process is called up. In addition, it is capable of preventing the same recovery process from being performed repeatedly in a short period by detecting the calling frequency that the servo recovery process is called up and executing the recovery process according to that calling frequency.

In the other feature of the present invention, the detection step comprises a step of detecting whether or not the calling frequency is greater than the specified value, and the execution step comprises: a step of selecting one of the multiple recovery processes according to the number of retrying the recovery process when the calling frequency is detected to be relatively low; a step of selecting a recovery process from among the multiple recovery processes with a relatively complex restoration process level, when the calling frequency is detected to be relatively high; a step of executing the selected recovery process; a step of updating the number of retries when restoration by the recovery process failed, and retrying the selected recovery process according to the number of retries; and a step of resetting the number of retries when restoration by the recovery process is successful.

In this other feature of the invention, when the frequency of calling up the servo recovery process is relatively low, the recovery process is selected according to the number of retries, so it is possible to select the optimum recovery process according to retries.

In yet another feature of the present invention, the detection step comprises a step of detecting whether or not the number of times within a specified period that the recovery process is called up is greater than a specified value.

In this feature of the invention, the frequency is easily detected since the number of times the process is called up within a specified period is used for detecting the frequency.

In even yet another feature of the present invention, the detection step comprises a step of calculating the number of times the servo recovery process is called up, a step of measuring the time required for the number of call ups to reach the specified value, and a step of detecting whether or not the aforementioned time is greater than the specified time.

In this feature of the invention, the frequency is easily detected since the time required for the number of call ups to reach the set value is measured.

Moreover, it is also possible to have a further step of clearing the frequency counter, which counts the number of times the servo recovery process is called up, after the number of call ups reaches the specified value.

In this feature, the frequency counter is cleared so the frequency is continuously detected.

Furthermore, the step of measuring the frequency time comprise: a step of storing a first time, when the servo recovery process is called and the frequency counter is zero; a step of storing a second time, when the servo recovery process is called and the value of the frequency counter has reached the specified value; and a step of measuring the frequency time that elapsed between the first time and second time.

In this feature, it is possible to measure the frequency time by a simple process.

Furthermore, the step of selecting one of the recovery processes according to the number of retries comprise a step of selecting a recovery process with a comparatively simple restoration process level when the number of retries is low, and a step of selecting a recovery process with a comparatively complex restoration process level when the number of retries is high.

In this feature, since the level of the restoration process increasingly becomes more complex, it is possible to select the optimum recovery process according to the number of retries.

In another feature of the present invention, the step of detecting the calling frequency comprises a step of detecting a first calling frequency of the servo recovery process, a step of detecting a second calling frequency of the servo recovery process, and a step of selecting one of the multiple recovery processes according to the first and second frequencies.

In this feature of the invention, the calling frequency is detected in multiple detection modes, so it is possible to select the optimum recovery process according to various calling frequencies.

In another feature of the present invention, the step of calling up the servo recovery process comprises a calling step of calling a recovery process with a simple restoration level for turning ON the servo loop for positioning the head, and a recovery process with a complex restoration level for executing calibration for the servo loop.

In this feature of the invention, since there are multiple recovery processes for the servo loop, it is possible to perform restoration to the on-track state through servo-loop control and the optimum recovery process.

In another feature, the servo recovery process comprises a recovery process with a simple restoration level for turning ON the servo loop for positioning the head, a recovery process with an intermediate restoration level for turning ON the servo loop after the head has been positioned in the specified position, and a recovery process with a complex restoration level for executing calibration of the servo loop.

In this feature, since there are simple, intermediate and complex recovery processes, an optimum recovery process can be selected according to the error state.

Furthermore, the step of calling up the servo recovery process comprises a step of detecting when the light beam of the optical head is off from the track of the optical storage medium and of calling up the servo recovery process, and the servo recovery process comprises a recovery process with a simple restoration level for turning ON the track servo loop for positioning the optical head on the track, and a recovery process with a complex restoration level for executing calibration of the servo loop.

This feature is applied to an optical storage device, so it is possible to restore a light beam on the track.

Furthermore, there also be a step of preventing selection of the recovery process with the complex restoration level for a specified time after the recovery process with the comparatively simple restoration level has been executed.

In this feature, it is possible to prevent the recovery method with the complex restoration level from being performed very often.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 12 is a diagram explaining the recovery levels of FIG. 5.

FIGS. 13A and 13B are diagrams explaining the frequency recovery of FIG. 5.

DETAILED DESCRIPTION OF THE PREFERRED EMBODIMENTS

Figure 1:
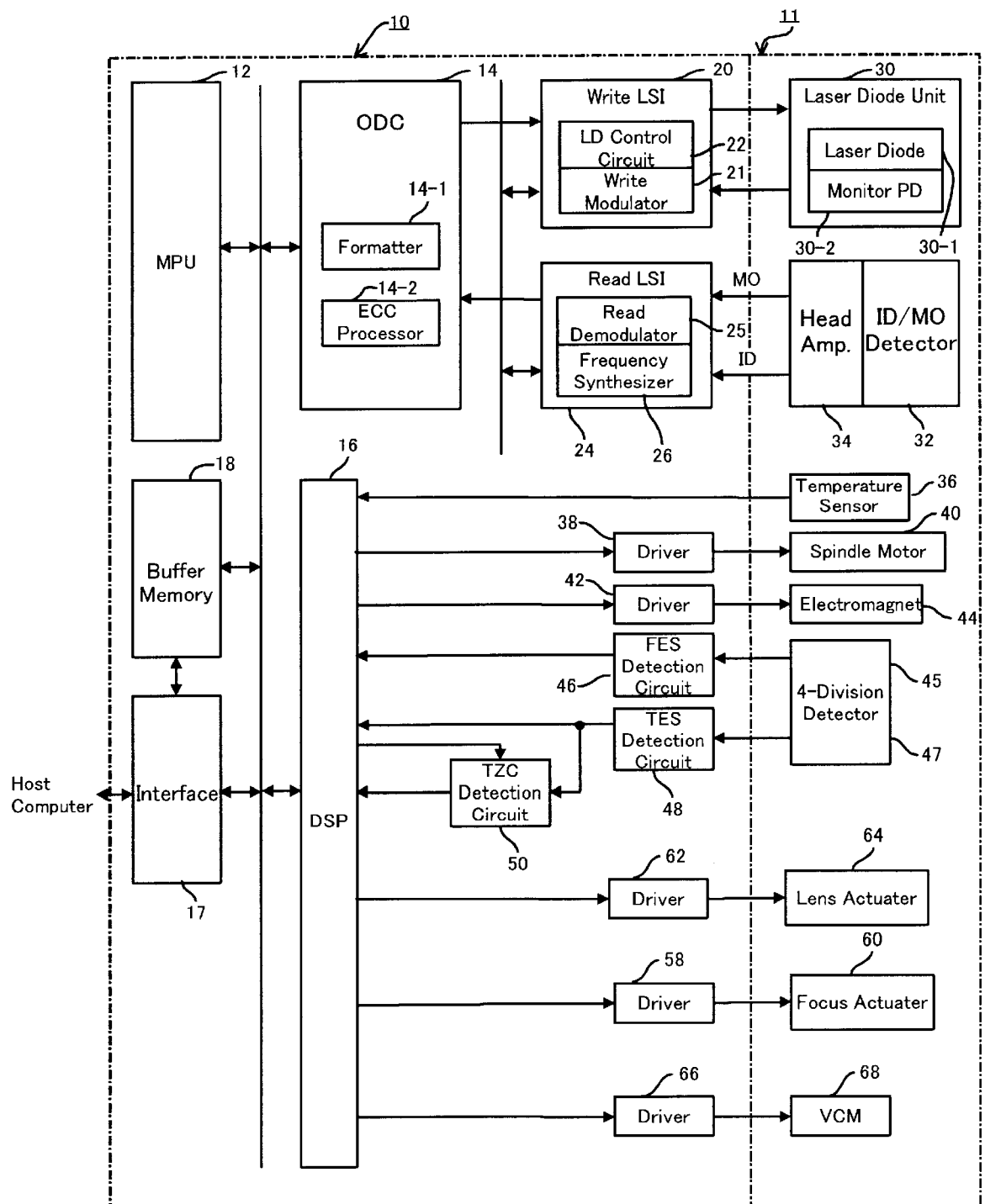
FIG. 1 is a block diagram of a magneto-optical disk device of an embodiment of the present invention.
Figure 2:
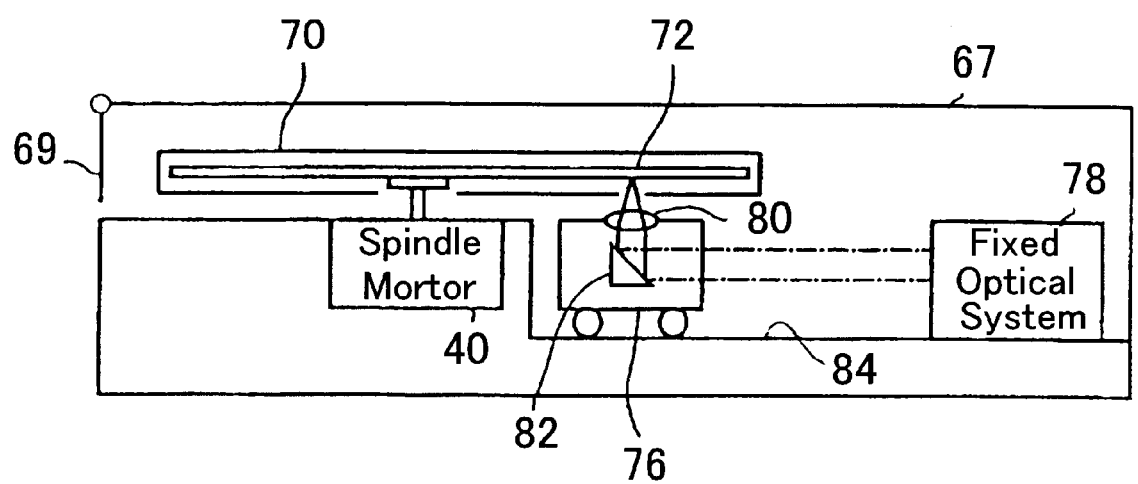
FIG. 2 is a diagram showing the optical disk drive of FIG. 1.

FIG. 1 is a block diagram of a magneto-optical disk device of one embodiment of the present invention, and FIG. 2 is a diagram showing the optical disk drive of FIG. 1.

As shown in FIG. 1, the magneto-optical disk device comprises a control unit 10 and disk drive 11. The microprocessor (MPU) 12 performs overall control of the magneto-optical disk device. The interface 17 performs the exchange of commands and data with the host (not shown in the figure). The optical disk controller (ODC) 14 performs the necessary processing for reading or writing to the magneto-optical disk (MO). The digital signal processor (DSP) 16 controls all of the mechanisms (described later) based on instructions from the MPU 12. The buffer memory 18 is shared by the MPU 12, ODC 14 and interface 17, and it stores write data and read data.

A formatter 14-1 and error correction code (ECC) processing unit 14-2 are provided in the ODC 14. During write access, the formatter 14-1 divides the NRZ write data into sector units for the optical disk, and generates the recording format. The ECC processing unit 14-2 generates ECC in sector data units, and adds it to the sector data. In addition, the ECC processing unit 14-2 generates and adds cyclic redundancy check (CRC) code. Furthermore, the ECC processing unit 14-2 converts the sector data to which ECC has been added to 1–7 run length limited code (RLL).

During read access, the ECC processing unit 14-2 performs a CRC check after 1–7 RLL reversed conversion of the read sector data. In addition, the ECC processing unit 14-2 detects and corrects errors with the ECC. Furthermore, the formatter 14-1 connects the NRZ data in sector units, and creates a NRZ read data stream. This data stream is transferred to the host from the interface 17 by way of the buffer memory 18.

The write LSI circuit 20 comprises a write modulation unit 21 and a laser diode control circuit 22. Depending on the type of MO disk, the write modulation unit 21 modulates the write data to pit position modulation (PPM) record (also called mark record) data format or pulse width modulation (PWM) record (also called edge record) data format. The laser diode control circuit 22 controls the laser diode unit 30 of the optical unit in the drive 11 according to this modulated data. This laser diode unit 30 comprises a laser diode 30-1, which shines a laser beam onto the MO disk, and a monitor detector 30-2.

The read LSI circuit 24 comprises a read demodulation unit 25, which has an auto gain control (AGC) circuit, filter and sector mark detection circuit; and a frequency synthesizer 26. The read demodulation unit 25, demodulates the PPM data or PWM data into the original NRZ data, after read clock and read data are generated from the input ID signal or MO signal. The ID/MO detector 32 in optical head of the drive 11 detects the light returned from the MO disk, and the ID signal/MO signal is input to the read LSI circuit 24 by way of the head amp 34. The frequency synthesizer 26 generates a frequency clock, which corresponds to the MO disk zone, as the read clock.

The temperature sensor 36 in the drive 11 detects the temperature of the drive. The detected drive temperature is given to the MPU 12 by way of the DSP 16, and based on the detected temperature, the MPU 12 controls the light emission power for reading, writing and erasing by the laser diode control circuit at an optimum value.

The spindle motor 40 rotates the MO (magneto-optical) disk. The DSP 16 controls the spindle motor 40 by way of the driver 38 according to instructions from the MPU 12. When recording or erasing, the electromagnet 44 supplies an external magnetic field to the loaded MO disk. The DSP 16 control the electromagnet 44 by way of the driver 42 according to instructions from the MPU 12. The 4-division detector 45 detects the light returned from the MO disk. The FES detection circuit 46 generates a focus error signal (FES) from the output of the 4-division detector 45, and inputs it to the DSP 16. The DSP 16 uses a focus servo loop to generate a focus drive signal, and controls the focus actuator 60 by way of the driver 58. The focus actuator 60 drives the objective lens of the optical head in the focus direction. In doing so, it performs focus-on control.

The TES detection circuit 48 generates a track error signal (TES) from the output of the 4-division detector 45 and inputs it to the DSP 16. The TES is also input to the track zero cross (TZC) detection circuit 50. The TZC detection circuit 50 generates a TZC pulse and inputs it to the DSP 16.

The DSP 16, based on the TES, uses the track servo loop to generate a track drive signal and controls the track (lens) actuator 64 by way of the driver 62. The track actuator 64 drives the objective lens of the optical head in the track direction. In doing so, it performs track-on control.

Moreover, the DSP 16, based on the TZC, performs seek control and controls the voice coil motor (VCM) 68 by way of the driver 66. The VCM 68 moves the optical head.

FIG. 2 is a diagram showing the configuration of the MO disk drive of FIG. 1. As shown in FIG. 2, there is a spindle motor 40 (described above) located in the housing 67. The MO disk cartridge 70 is inserted through the inlet 69. The MO disk 72 inside the cartridge 70 is rotated by the spindle motor 40.

The optical head comprises a carriage 76 and fixed optical system 78. The carriage 76 is moved along the rails 84 by the VCM 68 (see FIG. 1) in a direction such that it crosses the tracks of the MO disk 72. The carriage 76 comprises an objective lens 80, direction converter prism 82, focus actuator 60 and track actuator 64. The fixed optical system comprises the aforementioned laser diode unit 30, ID/MO detector 32 and 4-division detector 45 (see FIG. 1).

Figure 3:
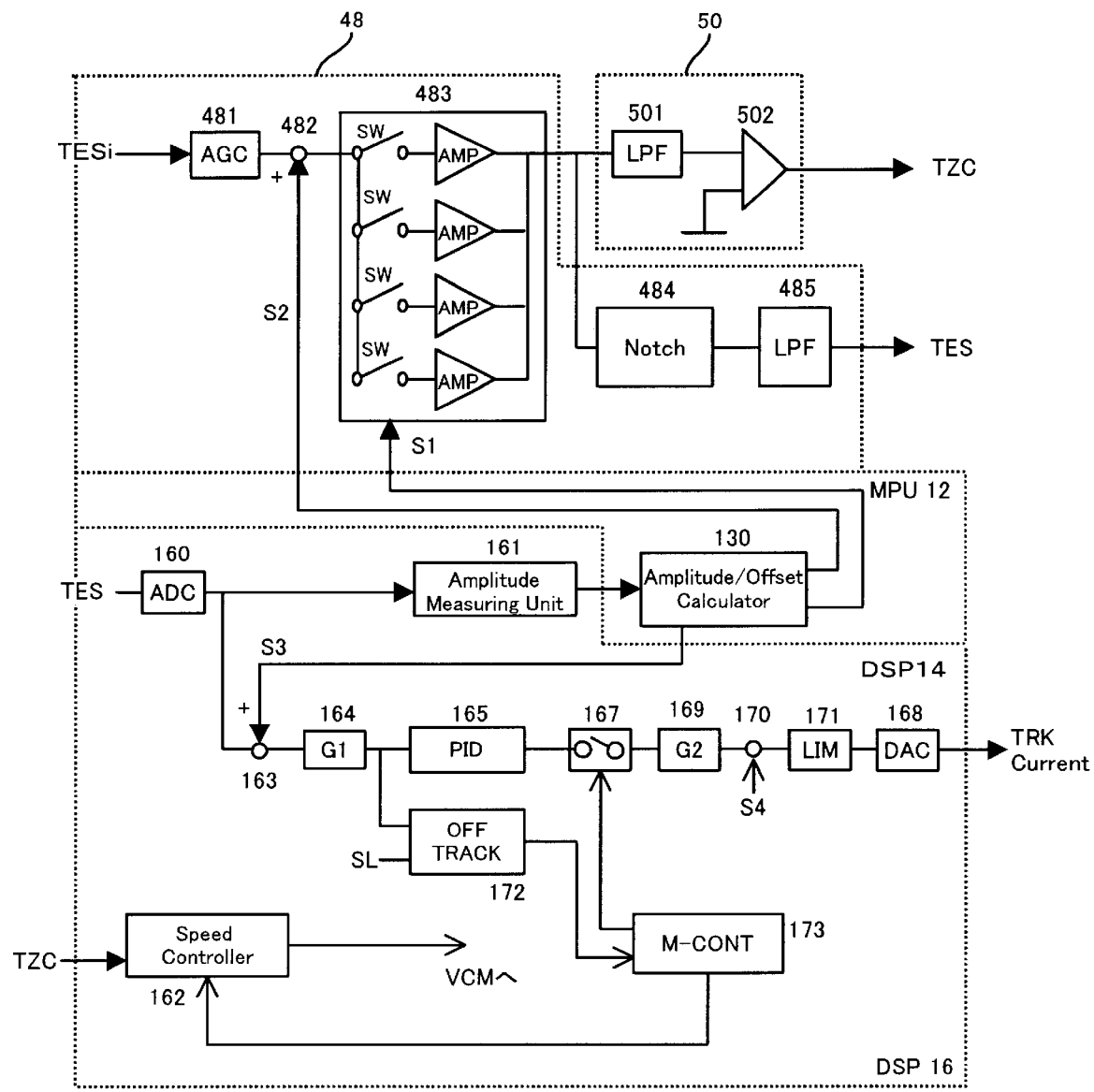
FIG. 3 is a block diagram of the main part of FIG. 1.

FIG. 3 is a block diagram of the TES detection circuit 48, TZC detection circuit 50 and DSP 16 of FIG. 1.

Figure 10:
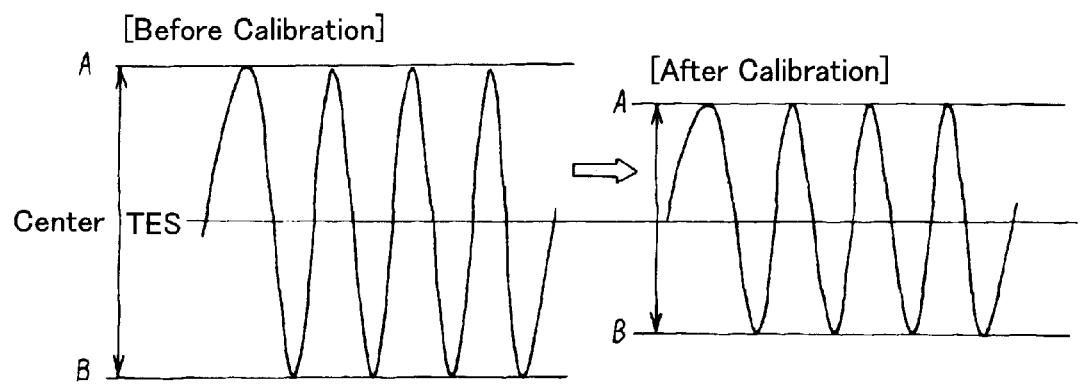
FIG. 10 is a diagram explaining the amplitude adjustment of FIG. 9.
Figure 11:
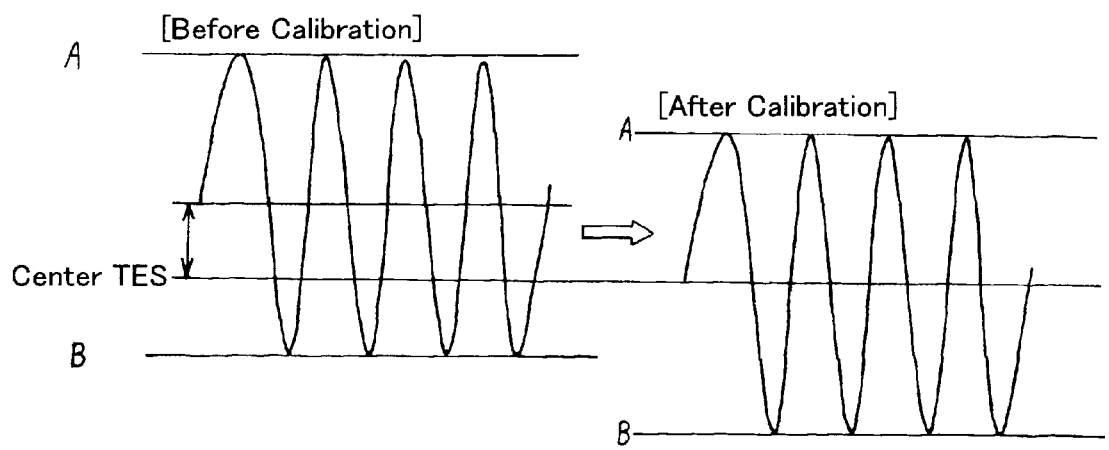
FIG. 11 is a diagram explaining the offset adjustment of FIG. 9.

In FIG. 3, the TES detection circuit 48 creates a track error signal TESi from the output of the 4-division detector 45. This track error signal TESi is shown in FIG. 10 and FIG. 11 to be described later. The AGC (auto gain control circuit) 481 adjusts the gain of this track error signal TESi. The node 482 adds the AGC output and TES offset correction signal S2. The TES offset correction signal S2 is for adjusting the offset of the track error signal TES, and it is sent from the amplitude/offset calculation unit 130 (described later) of the optical disk driver (ODD) of the MPU 12.

The gain adjustment circuit 483 adjusts the signal sensitivity of the track error signal. The gain adjustment circuit 483 comprises four amplifier circuits AMP that are arranged in parallel, and a switch SW for turning each of them ON. In addition, as described later, one of the four amplifier circuits AMP is selected such that the amplitude of the track error signal TES that is input to the DSP 16 does not exceed the range of the AD converter (ADC) for the DSP 16. The aforementioned amplitude/offset calculation unit 130 outputs a gain selection signal S1 for controlling the switch SW of the gain adjustment circuit 483.

The track error signal TESi that is output from the gain adjustment circuit 483, passes through a notch circuit 484 and a low-pass filter (LPF) 485, and then the track error signal TES, from which the noise has been removed and whose waveform has been adjusted, is output. Furthermore, the output of the gain adjustment circuit 483 is input to the TZC detection circuit 50. In the TZC detection circuit 50, the comparator 502 compares the track error signal TESi, which has been passed through the low-pass filter (LPF) 501, with a specified slice level, and then outputs a track zero cross (TZC) pulse.

The analog/digital converter (ADC) 160, located in the DSP 16, converts the TES of the TES detection circuit 48 described above to a digital value. The ADC 160 output is read by the DSP 16 at each sampling time. In the track servo loop of the DSP 16, the node 163 adds the TES input offset S3 to the read TES. The gain control unit 164, multiplies the TES from the node 163 by the gain G1, and absorbs irregularities in the input sensitivity (circuit constant, signal sensitivity, etc.).

The output of the gain control unit 164 is input to the off-track judgment unit 172. The off-track judgment unit 172, compares the absolute value of the input TES with the off-track slice level SL, and performs off-track judgment. For example, when the absolute value of the TES is larger than the slice level, it is judged to be off track. When judged as off track, an off-track flag is set. This off-track slice level is changed for read processing and write/erase processing. Normally, the off-track slice level during write/erase processing is set to a lower level than during read processing.

When this off-track flag is set, the main control unit 173 of the DSP 16 turns OFF the switch 167 (described later) and turns OFF the track servo. In addition, it sends a servo error interrupt to notify the MPU 12.

The output of the gain control unit 164 is input to the PID calculation unit 165. The PID calculation unit 165 performs well-known phase compensation processing. When the switch 167 is ON, the output of the PID calculation unit 165 is input to the gain control unit 169. The gain control unit 169 multiplies that output with the gain G2, and absorbs irregularities in the output sensitivity (drive sensitivity of the driver, acceleration sensitivity of the actuator, etc.). The node 170 adds the output offset S4 to the output of the gain adjustment unit 169. This output of the node 170 is then given to the digital/analog converter (DAC) 168 by way of the limiter 171. The DAC 168 converts the digital value of the limiter 171 to analog-track current, then inputs it to the driver 62 to drive the track actuator 64.

During the seek process, the difference between the target position and the current position is set, and the speed control unit 162 of the DSP 16 outputs a speed control signal to the driver 66 of the VCM 68 according to that difference. TZC is input to the speed control unit 162, and it updates the aforementioned difference.

The amplitude measurement unit 161 of the DSP 16 measures the amplitude of the TES from the ADC 160. The amplitude/offset calculation unit 130 of the ODD (firmware)

for the MPU 12 calculates the gain and offset of the TES from the amplitude of the TES. The calculated gain S1 and offsets S2, S3 are stored in the memory of the MPU 12.

Figure 4:
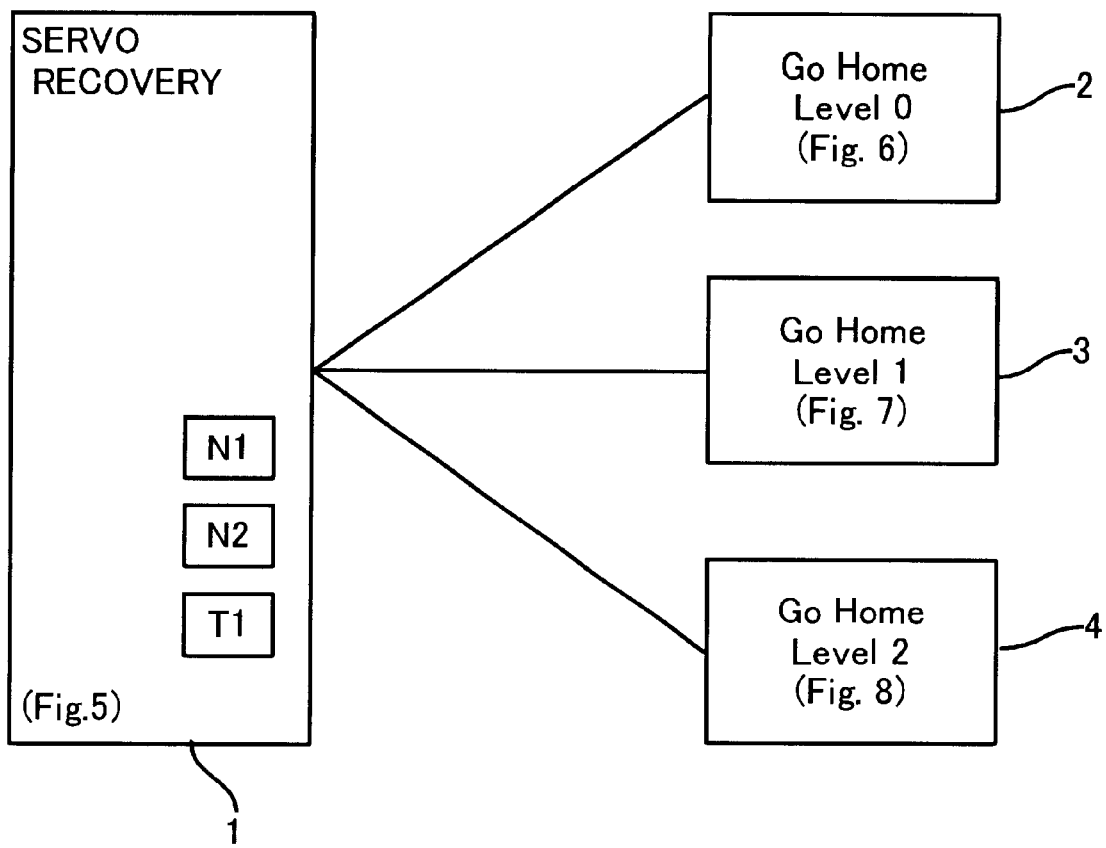
FIG. 4 is a diagram showing the firmware of an embodiment of the present invention.

FIG. 4 is a diagram showing the firmware of the MPU 12. The ODD (optical disk driver) of the MPU 12 calls up the servo recovery process 1 (described later in FIG. 5) according to an error interrupt which occurred due to an off-track detection as described above. The servo recovery process 1 comprises a recovery counter N1 for counting the number of retries, a frequency counter N2 for counting the number of times the servo recovery process was called up, and a counter T1 for storing the time at which the servo recovery process was called up.

Figure 6:
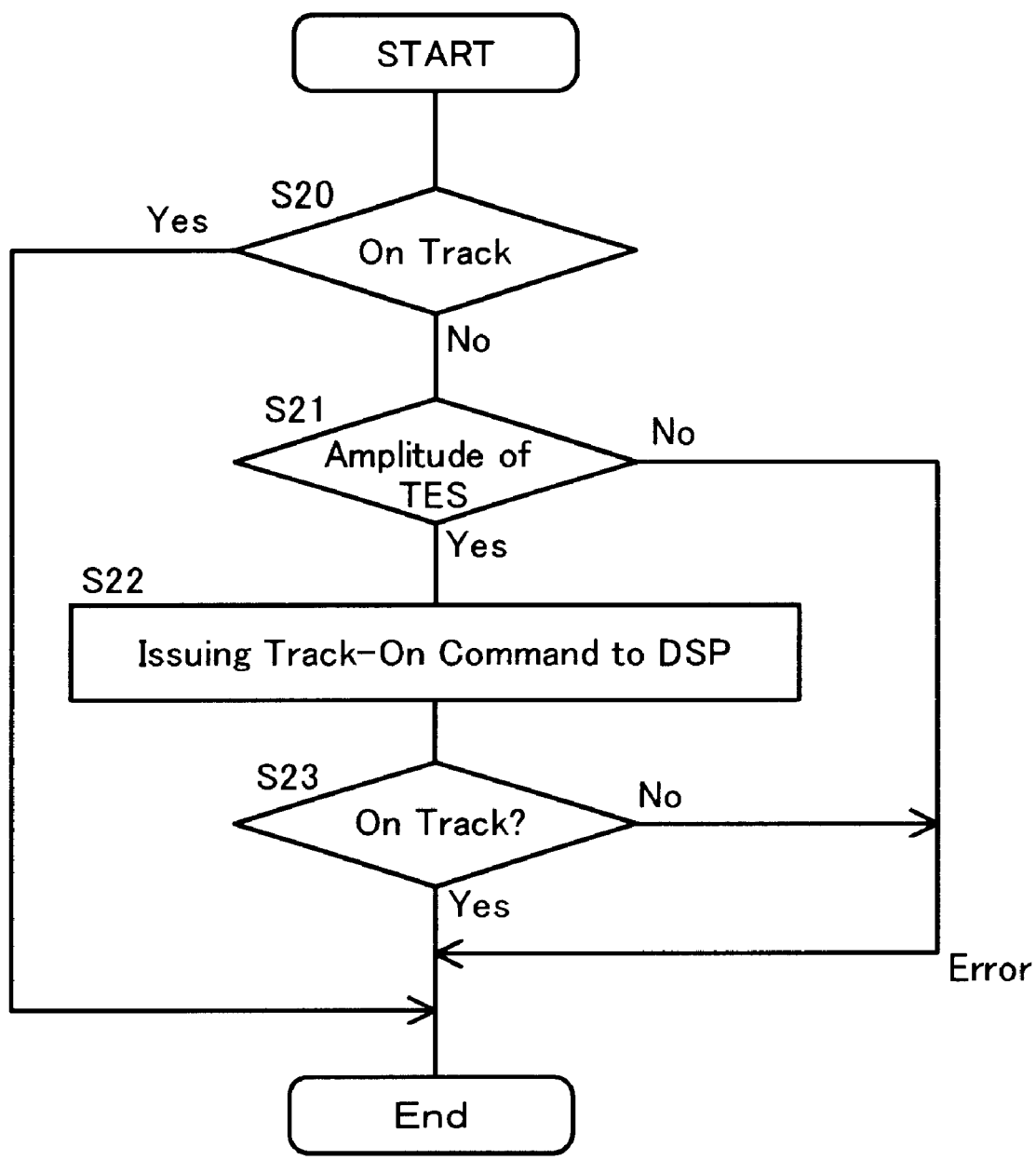
FIG. 6 is a flowchart showing the flow for 'Go Home Level 0' (light recovery process) of FIG. 5.
Figure 7:
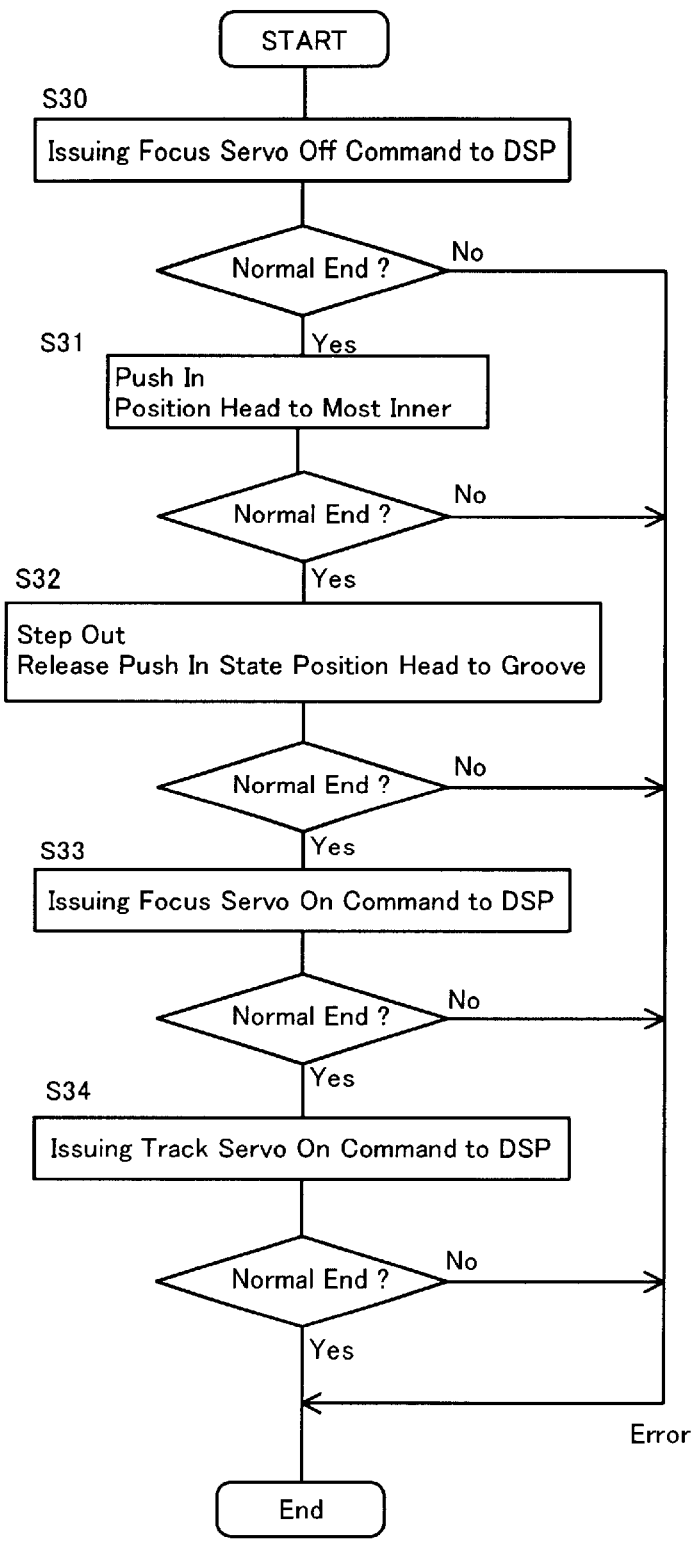
FIG. 7 is a flowchart showing the flow for 'Go Home Level 1' (intermediate recovery process) of FIG. 5.
Figure 8:
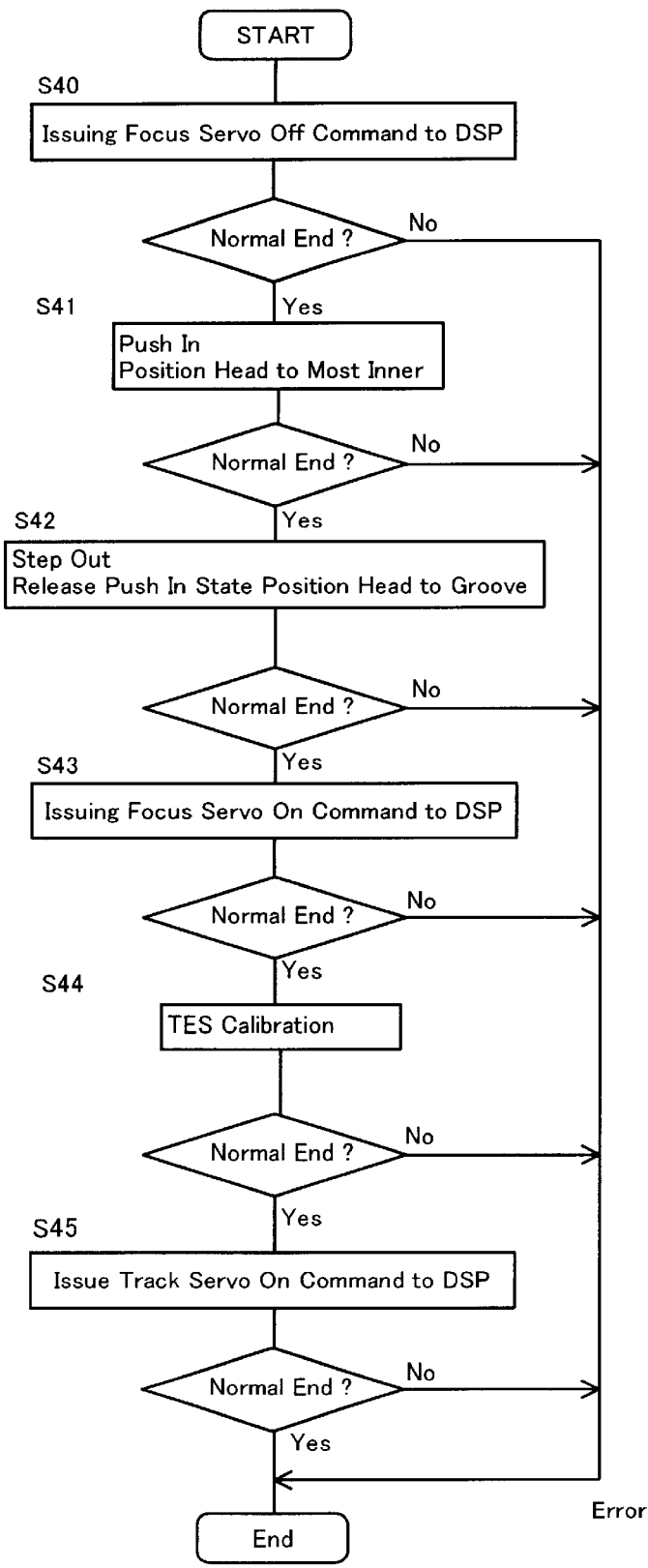
FIG. 8 is a flowchart showing the flow for 'Go Home Level 2' (serious recovery process) of FIG. 5.

This servo recovery process 1 comprises three kinds of recovery processes. In other words, there is a light recovery process (Go Home Level 0) 2, an intermediate recovery process (Go Home Level 1) 3 and a serious recovery process (Go Home Level 2) 4. The light recover process 2, as described later using FIG. 6, is a simple restoration process for restoring the on-track state in the shortest time. The intermediate recovery process 3, as described later using FIG. 7, is a intermediate level restoration process. The serious recovery process 4, as described later using FIG. 8, is a complex restoration process which includes calibration. The servo recovery process 1, as described later using FIG. 5, selects one of these recovery processes.

Next, the light recovery process (Go Home Level 0) will be explained using FIG. 6.

(S20) The MPU 12 checks the on-track state. As described above, when the DSP 16 detects off track, it immediately notifies the MPU 12 with an error interrupt. At this time, the DSP 16 does not immediately turn OFF the track servo loop (turns switch 167 OFF) when off track occurs. The DSP 16 turns the track servo loop OFF when off track occurs continuously a specified number of times. When off track occurs temporarily due to a light cause, the on-track state may be restored by keeping the track servo loop ON even though an off track occurred once. Therefore, the MPU 12 sends an inquiry to the DSP 16 about the on-track status. When it is on-track status, there is no need for recovery processing, and it ends normally.

(S21) On the other hand, when it is not the on-track state, the MPU 12 judges whether the amplitude of the TES signal is out. This can be determined by reading the output of the amplitude measurement unit 161 of the DSP 16. When the amplitude of the TES signal is not out, the light beam may be shifted to the mirror position of the optical disk, and since it cannot be restored with this process, it ends in error.

(S22) When the amplitude of the TES signal is out, the MPU 12 issues a track servo ON command to the DSP 16. From this, the DSP 16 turns ON the switch 167 to the track servo loop. In the case of an off track due to a light cause such as vibration or medium defect, it may be possible to restore the on-track state by turning ON the track servo loop.

(S23) The MPU 12 sends an on-track inquiry to the DSP 16. After the track servo is ON, the DSP 16 detects whether the amplitude of the TES has converged, and detects the on-track status. If no on track, the process ends in error. On the other hand, if it is on track, the process ends normally.

In this way, in order to restore the on-track status in the shortest time, the light recovery process issues a track servo ON command.

Next, the intermediate recovery process (Go Home Level 1) will be explained using FIG. 7.

(S30) The MPU 12 issues a focus servo OFF command to the DSP 16. From this, the DSP 16 turns OFF the focus servo loop (not shown in the figure). In this process, as described below, the carriage is pushed to the inner-most side with no track so there is a possibility that the focus servo will go OFF. Therefore, before the process, the focus servo is turned OFF. If the focus servo OFF operation does not end normally, the recovery process ends in error.

(S31) After the focus servo OFF ends normally, the MPU 12 performs the 'Push In' process. In other words, regardless of the servo state, the carriage 76 is positioned in a position where the home sensor (not shown in the figure) will go ON. This home sensor is either a magnetic sensor or optical sensor, and is located on the inner-most side of the MO disk. Therefore, the MPU 12 causes current to flow to the VCM 68 by way of the DSP 16. Moreover, in the drive in which there is no home position sensor, the current which pushes the VCM is increased gradually and pushes the carriage 76 toward the inner side. If this 'Push In' process does not end normally, the recovery process ends in error.

(S32) After the 'Push In' process ends normally, the MPU 12 performs the step out process. In other words, the push in condition is released and the carriage 76 is positioned at a position with a groove. Therefore, the MPU 12, by way of the DSP 16, causes current to flow to the VCM 68, and moves the carriage 76 to a position where the home position sensor is OFF. Also, in the drive in where there is no home position sensor, the DSP 16 uses the track counter, which counts the TZC, as a position sensor, and is also able to move to the target position. If this step out process does not end normally, the recovery process ends in error.

(S33) After the step out process ends normally, the MPU 12 issues a focus servo ON command to the DSP 16. From this, the DSP 16 turns ON the focus servo loop (not shown in the figure). In doing so it restores the just focus state. If focus servo ON does not end normally, the recovery process ends in error.

(S34) If focus servo ON ends normally, the MPU 12 issues a track servo ON command to the DSP 16. From this, the DSP 16 turns ON the switch 167 for the track servo loop. The MPU 12 inquires of the DSP 16 whether on track occurred. If not on track, the recovery process ends in error. On the other hand, if on track, the process ends normally.

In this way, the intermediate recovery process assumes that the light beam is in a position where it cannot go on track (for example the mirror position, etc.), and after moving it to the inner reference position, it positions it at a position with a track. In doing so, even if the light beam is in a position where it cannot go on track, it is positioned at a position where there is a track and is able to restore the on-track status by a servo ON command.

In this intermediate recovery process, it is possible to perform the VCM adjustment process. That is, in the double servo method, which controls both the lens actuator and VCM, the offset of the VCM driver is adjusted using the average value of the VCM current during double servo. Moreover, in a device that has no lens actuator and where all movement is performed by VCM, the offset of the track drive when on track is adjusted.

Next, the serious recovery process (Go Home Level 2) will be explained using FIG. 8.

(S40) The MPU 12 issues a focus servo OFF command to the DSP 16. From this, the DSP 16 turns OFF the focus servo loop (not shown in the figure). In this process as well, as described below, the carriage is pushed toward the inner-most side with no track, so there is a possibility that the focus servo will go OFF. Therefore, the focus servo is turned OFF before the process. If focus servo OFF does not end normally, the recovery process ends in error.

(S41) If focus servo OFF ends normally, the MPU 12 performs the Push In process. In other words, regardless of the servo state, the carriage 76 is position at position where the home sensor (not shown in the figure) goes ON. This home position sensor is located on the inner-most side of the MO disk. Therefore, the MPU 12 causes current to flow in the VCM 68 by way of the DSP 16. Also, in the drive in which there is no home position sensor, the pushing current of the VCM gradually increases, and it pushes the carriage 76 toward the inner side. If this Push In process does not end normally, the recovery process ends in error.

(S42) If the Push In process ends normally, the MPU 12 performs the step out process. In other words, the push in condition is released and the carriage 76 is positioned at a position with a groove. Therefore, the MPU 12, by way of the DSP 16, causes current to flow to the VCM 68 and moves the carriage 76 to a position where the home position sensor is OFF. Also, in the drive in where there is no home position sensor, the DSP 16 uses the track counter, which counts the TZC, as a position sensor, and is also able to move to the target position. If this step out process does not end normally, the recovery process ends in error.

(S43) If the step out process ends normally, the MPU 12 issues a focus servo ON command to the DSP 16. From this, the DSP 16 turns ON the focus servo loop (not shown in the figure). In doing so it restores the just focus state. If focus servo ON does not end normally, the recovery process ends in error.

Figure 9:
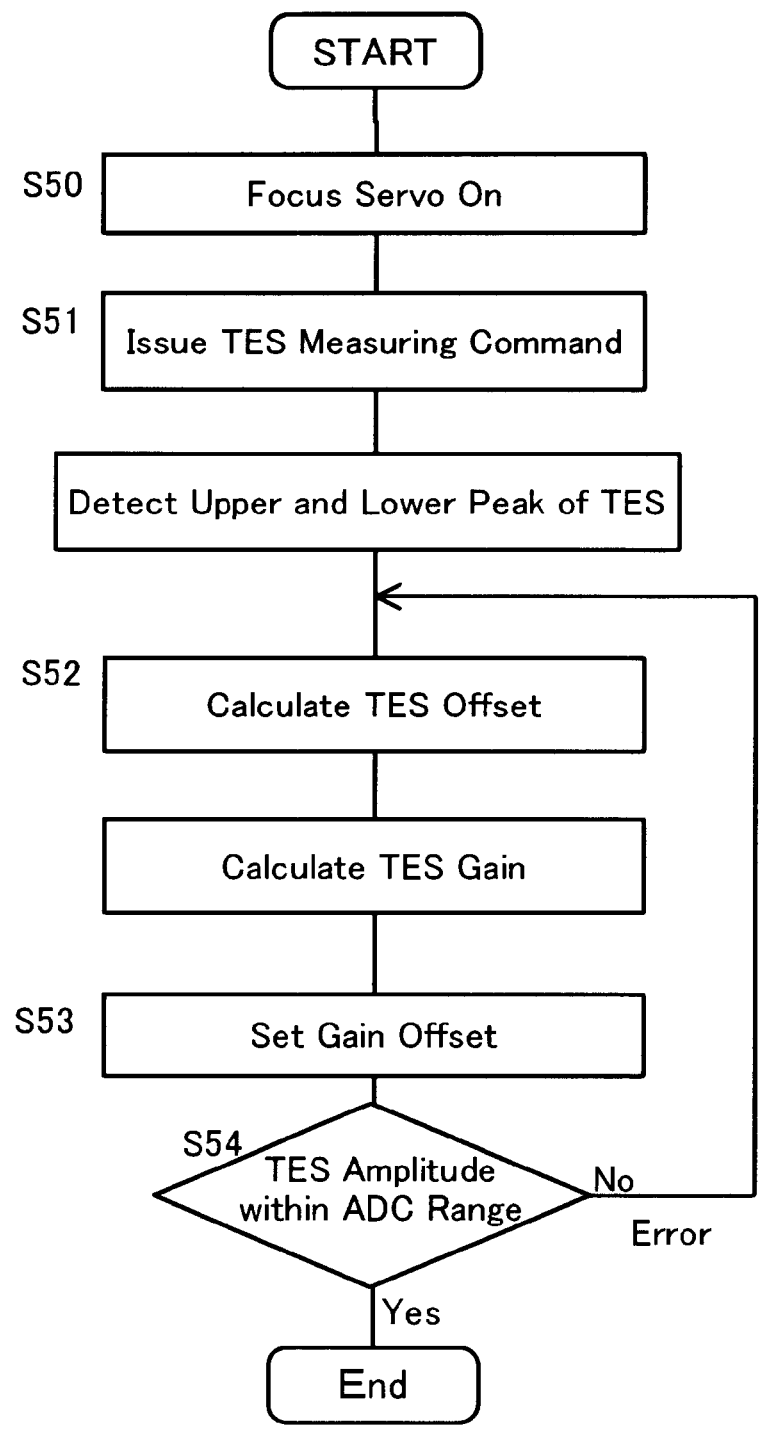
FIG. 9 is a flowchart showing the flow of the TES adjustment process of FIG. 8.

(S44) If focus servo ON ends normally, the MPU 12 performs the TES calibration process. As shown in FIG. 9, FIG. 10 and FIG. 11, and as described below, the amplitude and offset of the TES is adjusted by the amplitude/offset calculation unit 130 of the MPU 12. If this calibration process does not end normally, the recovery process ends in error.

(S45) If this calibration process ends normally, the MPU 12 issues a track servo ON command to the DSP 16. From this, the DSP 16 turns ON the switch 167 for the track servo loop. The MPU 12 inquires of the DSP 16 whether on track occurred. If not on track, the recovery process ends in error. On the other hand, if on track, the process ends normally.

Figure 17:
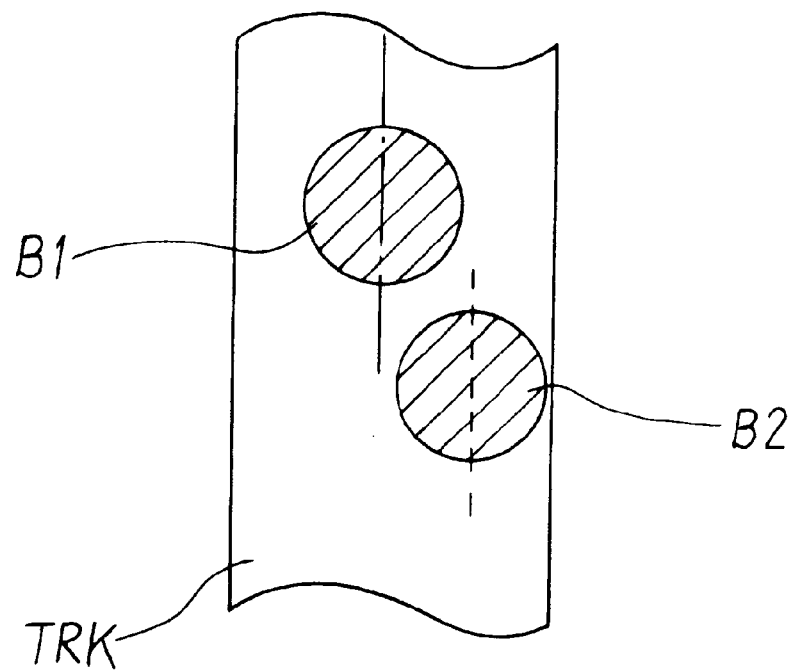
FIG. 17 is a diagram illustrating the prior art.

In this way, as shown in FIG. 17, the serious recovery process assumes that the light beam follows the track edge and that it is in an unstable state, and it adjusts the offset and gain of the TES to make the light beam follow the center of the track. In addition, after the light beam is positioned at the reference position on the inner side, in the same way as done in the intermediate recovery process, it is positioned at a position with a track. In doing so, even if the light beam shifts to a position where it cannot go on track, it is pushed to a position where there is a track, so it is possible to restore the on track state with a servo ON command.

In this serious recovery process, it is possible to adjust the lens position with a device in which a lens position sensor is installed. In other words, the offset of the track drive is adjusted such that the lens position signal LPOS becomes "0", and the center of the LPOS is set.

The TES calibration process will be explained using FIG. 9.

(S50) The MPU 12 issues a focus ON command to the DSP 16. This turns ON the focus servo as described above.

(S51) The MPU 12 issues a TES measurement command to the DSP 16. From this, the amplitude measurement unit 161 of the DSP 16 (see FIG. 3) samples the TES at set intervals. In addition, at each sampling interrupt during one rotation, the amplitude of the TES is compared with the previous sample value, to find the upper and lower peak values of the TES (called value A and value B) (see FIG. 10 and FIG. 11).

(S52) The amplitude/offset calculation unit 130 of the MPU 12 (see FIG. 3) reads value A and value B, and calculates the TES amplitude W, TES offset S and TES gain G according to the following equations:

$W$=Absolute value $(A-B)$ $S=(A+B)/2$ $G=(TT/(A-B))\times G0;$ where TT is the target value for the TES amplitude, and G0 is the initial TES gain.

(S53) As shown in FIG. 10, the amplitude/offset calculation unit 130 of the MPU 12 (see FIG. 3) sets the circuit gain S1 (see FIG. 3) based on the this calculated gain G such that the TES amplitude is within the range of the ADC 160 of the DSP 16. Moreover, it sets the gain G2 such that the TES amplitude inside the DSP 16 is constant. Similarly, as shown in FIG. 11, the calculation unit 130 of the MPU 12 sets the TES offset S2 based on the calculated offset S. Furthermore, it sets the remaining offset in the circuit, that cannot be obtained, as the offset S3 (see FIG. 3).

(S54) The calculation unit 130 of the MPU 12 judges whether or not the TES amplitude is within the range of the ADC 160. If it is not within the range, the process returns to step S52 and the TES amplitude and offset measurements are repeated. On the other hand, if the TES amplitude is judged to be within the ADC range, adjustment ends. These parameters are then stored in memory.

Next, the servo recovery process shown in FIG. 5 will be explained.

(S10) The MPU 12 judges whether or not the retry counter N1 is "0". When the retry counter N1 is not "0", then a retry is in progress and the process advances to step S17.

(S11) When the retry counter N1 is "0", then it is judged that the servo recovery process has been called, the frequency counter N2 is checked. The frequency counter N2 is a counter for counting the frequency of the servo recovery process. When the frequency counter N2 is "0", then it is judged that the servo recovery process has been called for the first time, and the current time Tn are stored as the starting time T1. In addition, the process advances to step S12. However, when the frequency counter N2 is not "0", then it is judged that the servo recovery process was called in the past, and the process advances to step 12.

(S12) "I2" is used as the limit number of times for checking the frequency of the servo recovery process. The value of the frequency counter N2 is compared with the limit value I2 (for example 20 times). If N2 is greater than or equal to I2 (N2≧I2), then the number of times N2 that the servo recovery process has been called is judged to have reached the limit value I2. Therefore, when this happens, the difference t between the times T2 and T1 when the servo recovery process was called is calculated.

(S13) "T0" is taken to be the limit period for checking the frequency number. The time t and the period T0 are compared.

(S14) When the time t is less than the period T0, then, as shown in FIG. 13A, the number of times that the servo recovery process was called during the limit period is high. In other words, it is judged that call-up frequency is high. When this kind of continuous servo recovery process occurs, the specified serious recovery process will be executed as the frequent recovery process. That is, after the number of calls N2 is cleared to "0", the process advances to the serious recovery process (Go Home Level 2) of step S17, (S15) If the time t is greater than the period T0, then, as shown in FIG. 13B, the number of times that the servo recovery process was called up during the limit period is low. In other words, it is judged that the call-up frequency of the servo recovery process is low. After the number of calls N2 is cleared to "0", the process advances to step S17.

(S16) When in step S12, N2 is not greater than or equal to I2, then the number of times N2 that the servo recovery process is called up is judged not to have reached the limit value I2. Therefore, the call-up number N2 is increased by an increment of "1", and the process advances to step S17.

(S17) The value of the retry counter N1 is checked. When the value of the retry counter N1 is assigned to the light recovery process, then the light recovery process (Go Home Level 0) is executed. If the value of the retry counter N1 is assigned to the intermediate recovery process, then the intermediate recovery process (Go Home Level 1) is executed. If the value of the retry counter N1 is assigned to the serious recovery process, then the serious recovery process (Go Home Level 2) is executed.

For example, the relationship between the retry (recovery) counter N1 and the recovery level (light, intermediate, serious) is assigned as shown in FIG. 12. In this example, when the value of N1 is "0" to "2", "4" to "6", "8" to "A" or "C" to "E", then the light recovery process (level 0) is selected. Similarly, when N1 is "3" or "B", then the intermediate recovery process (level 1) is selected, and when N1 is "7" or "F", then the serious recovery process (level 2) is selected.

Furthermore, when the value of the retry counter N1 is not assigned to the serious recovery process, then it is judged that the number has exceeded the limit value I1 for retries, and the recovery process ends in error.

(S18) The recovery process is judged whether or not it ended normally. If the recovery process ended normally, then the retry counter N1 is cleared to "0" and the recovery process ends. On the other hand, if the recovery process did not end normally, then a retry is necessary. Therefore, the retry counter N1 is increased by an increment of "1", and the process returns to step S17.

Since the recovery process is selected in this way according to the frequency that the servo recovery process is called up, it is possible to detect if servo errors and the light recover process are repeatedly performed, and thus it is possible to forcibly execute a higher level recovery process. This makes it possible to prevent servo errors and the light recovery process from being performed repeatedly.

In this example, an explanation was given of executing the serious recovery process according to the frequency of the light recovery process, however, it is also possible to execute the intermediate recovery process. That is, it is possible to execute a higher level of recovery process according to the frequency of a certain recovery process.

Moreover, the timer counter used for measuring the frequency can be made easily by adding it to the program.

Figure 14:
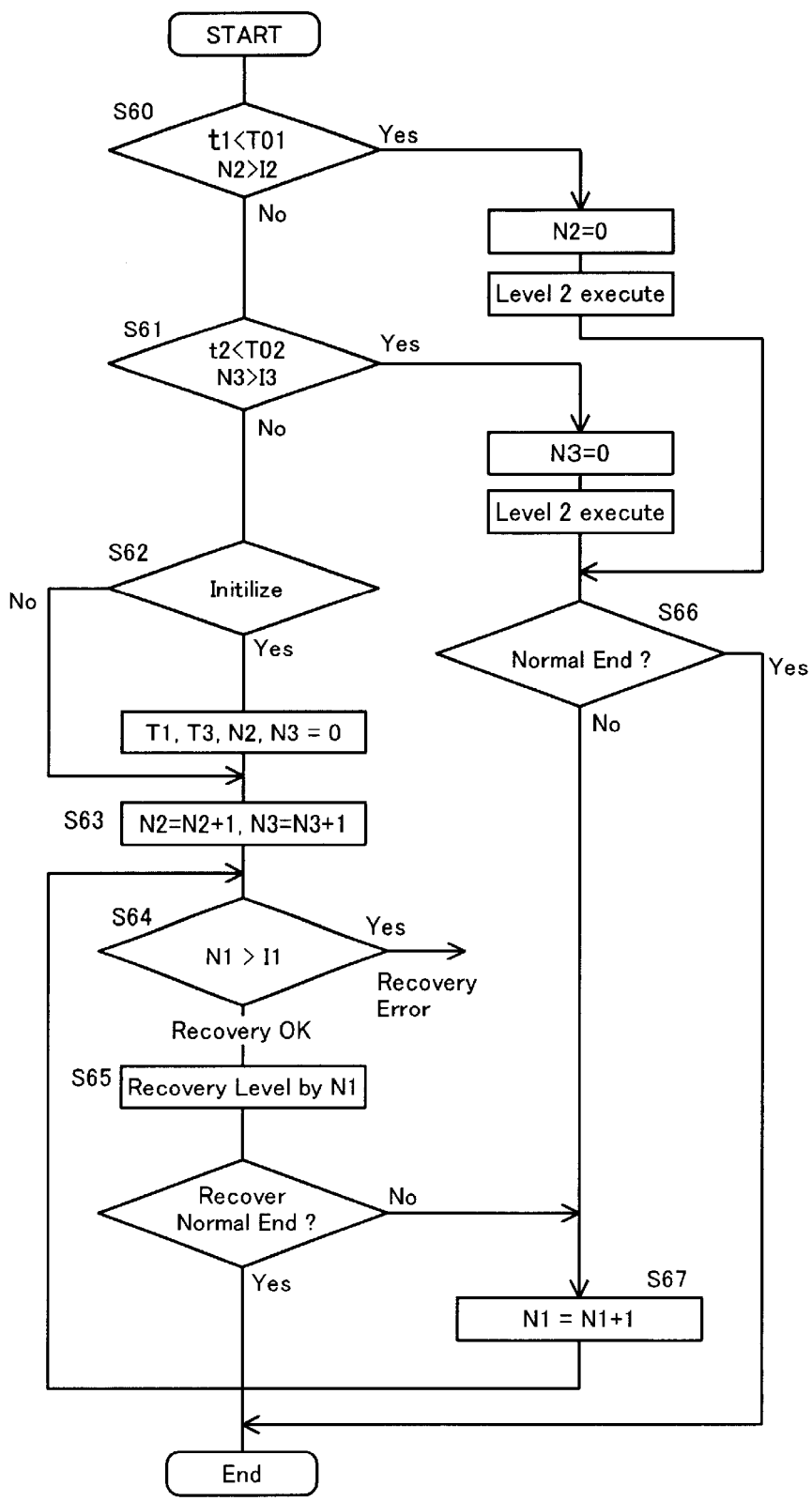
FIG. 14 is a flowchart showing the flow of another servo recovery process of the present invention.

FIG. 14 is a flowchart showing the flow of the servo recovery process of another embodiment of the present invention.

In this embodiment, the appropriate recovery process is performed for the respective frequency conditions by employing frequency timers, for measuring the time until moving to the frequency process, frequency counter limit values or frequency counters.

In other words, there is a counter N2 for checking frequency process 1, and a counter N3 for checking frequency process 2. The limit number of times for frequency process 1 is I2, and the limit number of times for frequency process 2 is I3. Furthermore, the retry counter N1 and retry limit value I1 are used. The limit period for frequency process 1 is T01, the limit period for frequency process 2 is T02, the reference time (starting time) for frequency process 1 is T2, and the reference time (starting time) for frequency process 2 is T3.

(S60) When the counter N2 for checking the frequency process 1 has reached the limit number of times I2 for frequency process 1, the difference t2 between the current time Tn and the reference time T2 is calculated. Moreover, if the difference t2 is less than the limit period T01 for frequency process 1, then the counter N2 is cleared to "0", and the frequency process 1 (for example, level 2 serious recovery process) is executed.

(S61) When the counter N3 for checking the frequency process 2 has reached the limit number of times I3 for frequency process 2, the difference t3 between the current time Tn and the reference time T3 is calculated. Moreover, if the difference t3 is less than the limit period T02 for frequency process 2, then the counter N3 is cleared to "0", and the frequency process 2 (for example, level 2 serious recovery process) is executed.

(S62) Similar to that described above, this step checks whether to initialize the frequency timer and frequency counter. If they are to be initialized, it initializes the frequency timer and frequency counter.

(S63) The frequency counters N2, N3 are increased by an increment of "1".

(S64) The retry counter N1 is judged as to whether or not it has exceeded the retry limit I1. If the retry counter N1 exceeds the retry limit I1, recovery is not possible and the recovery process ends in error.

(S65) If the retry counter N1 does not exceed the retry limit I1, then in the same way as done instep S17 described above, the recovery process is selected according to the value of the retry counter N1, and executed. If this recovery process ended normally, the process ends. On the other hand, when the recovery process did not end normally, the process advances to step S67.

The aforementioned frequency recovery process is judged as to whether it ended normally. If the frequency recovery process ended normally, then the process ends.

(S67) If the frequency recovery process did not end normally, the retry counter N1 is increased by an increment of "1", and the process returns to step S64.

By employing frequency timers, for measuring the time until moving to the frequency process, frequency counter limit values or frequency counters in this way, it is possible to perform the proper recovery process for the respective frequency condition.

Figure 15:
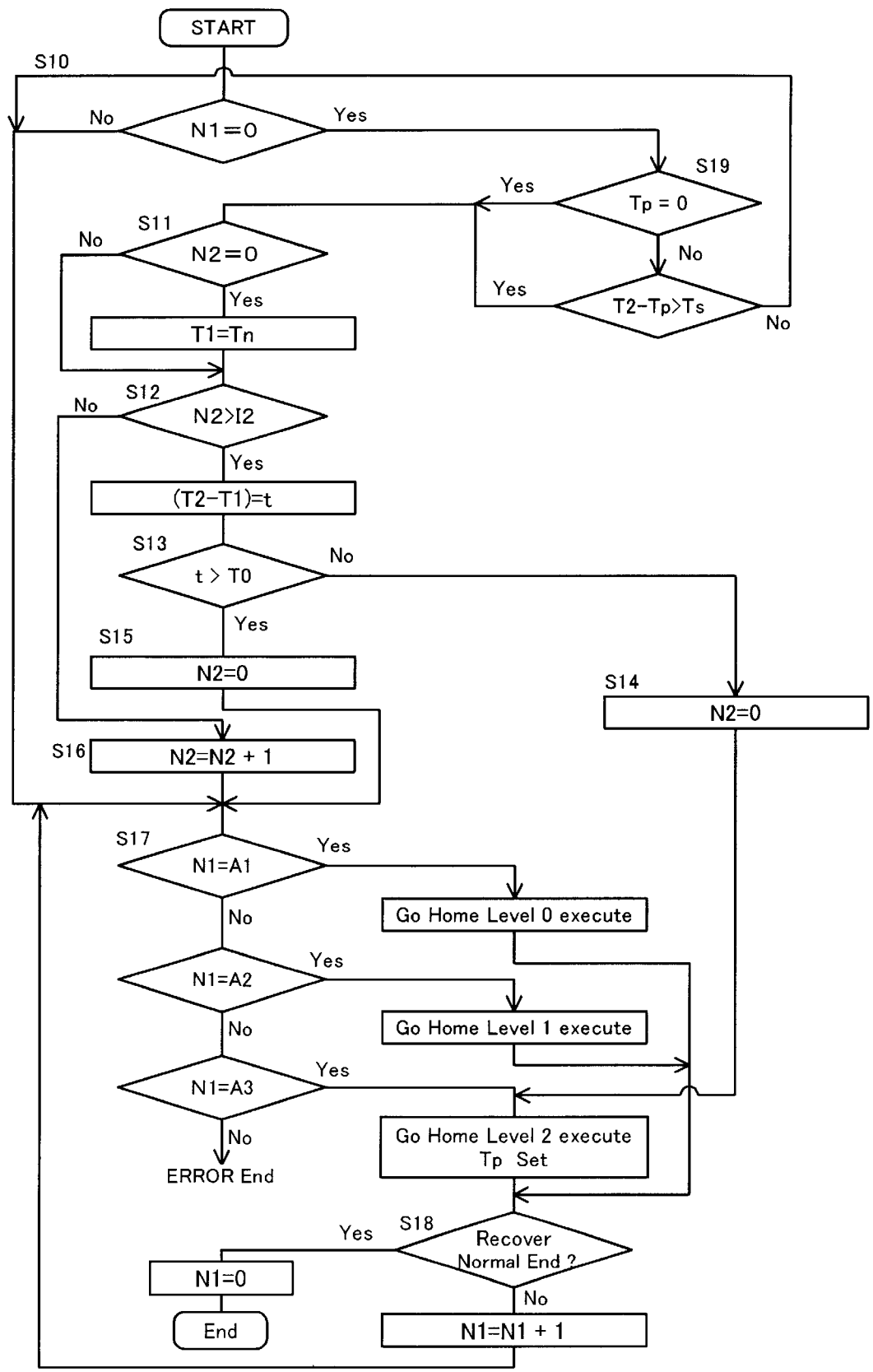
FIG. 15 is a flowchart showing the flow of yet another servo recovery process of the present invention.

FIG. 15 is a flowchart showing the flow of a recovery process for yet another embodiment of the present invention.

Figure 16:
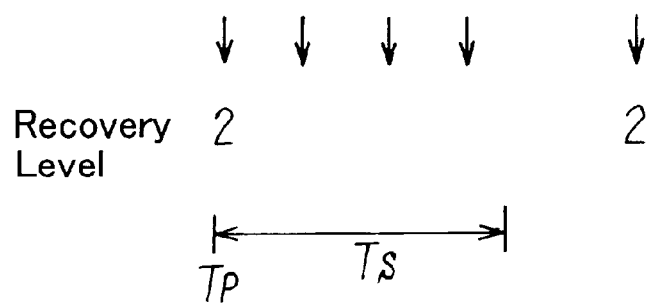
FIG. 16 is a diagram explaining the limitations of the frequency recovery of FIG. 15.

This embodiment prevents frequent occurrence of the frequency recovery process (serious recovery process) for off track due to medium defects, dust or the like. As shown in FIG. 16, this prevents frequency detection for only a set time Ts after the frequency recovery process (serious recovery process) is executed. In doing so, it is also possible to prevent frequent occurrence of frequency recovery process (serious recovery process).

Figure 5:
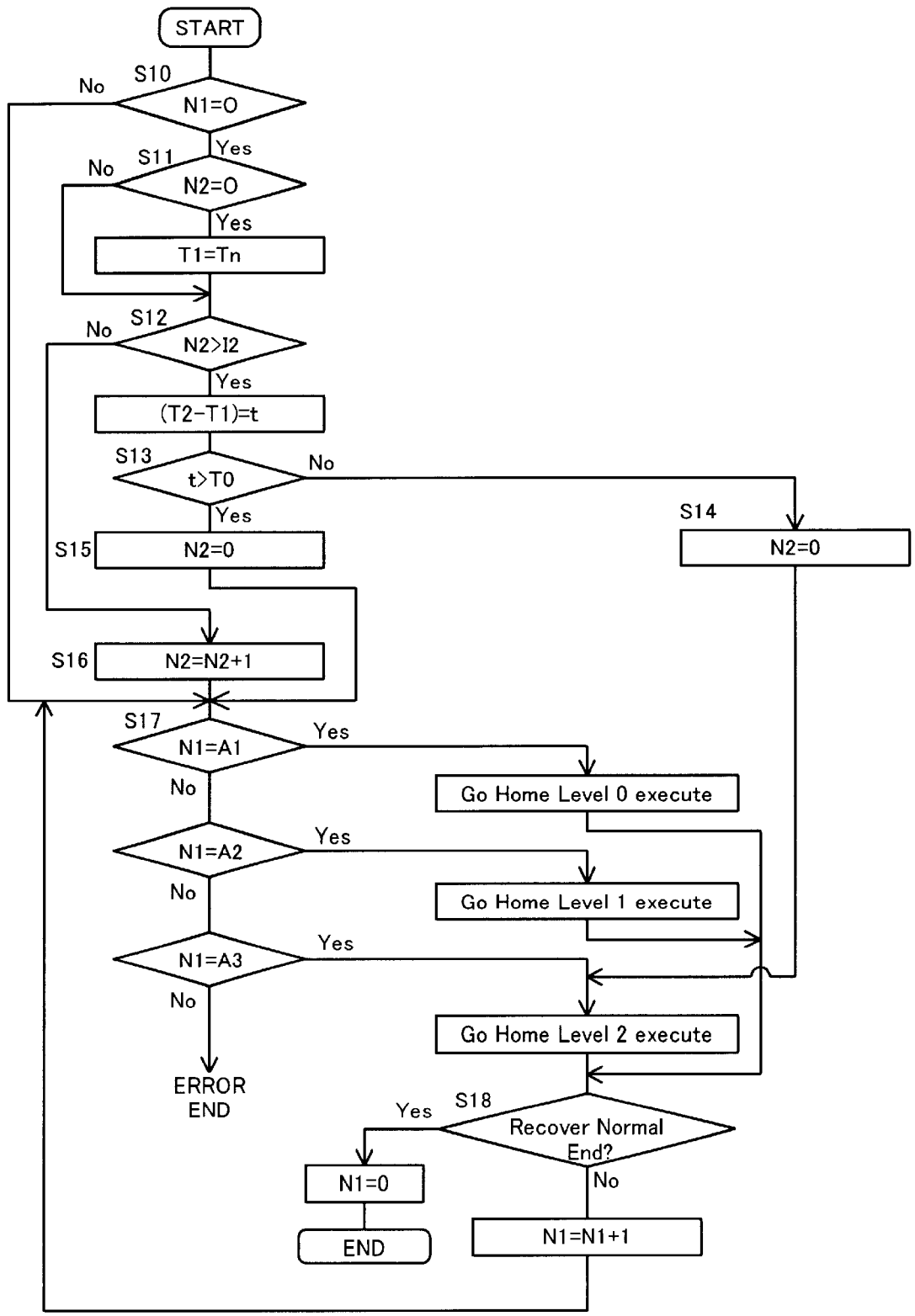
FIG. 5 is a flowchart showing the flow of the servo recovery process of an embodiment of the present invention.

In FIG. 15, steps S10 to S18 are nearly the same as in the other embodiments, however step S19 has been added to the embodiment shown in FIG. 5. Here, the time that the serious recovery process (Go Home Level 2) is executed is Tp, and the limit time for execution of the serious recovery process (Go Home Level 2) is Ts.

(S19) In step S10, when the retry counter N1 is "0", it is judged that the servo recovery process has been called, and time Tp is judged whether or not it is "0". If the time Tp is "0", the serious recovery process (Go Home Level 2) is still not executed, so the process advances to step S11. On the other hand, if the time Tp is not "0", then it means the serious recovery process (Go Home Level 2) was executed in the past. Therefore, the difference between the time T2 when this servo recovery process was called and the time Tp is judged whether or not it has exceeded the execution limit time Ts. If it has exceeded the limit time Ts, then the time since the serious recovery process (Go Home Level 2) was executed has passed the limit time Ts, so the servo recovery process skips the frequency detection process and advances to step S17.

In step S17, the current time is set for the time Tp mentioned above, when the serious recovery process (Go Home Level 2) is executed.

In this way, frequency detection is disabled for a set time after the frequency recovery process (serious recovery process) has been executed. Moreover, it is possible to prevent frequent occurrence of the frequency recovery process (serious recovery process) even if off track occurs frequently due to medium defects, dust or the like.

In addition to the embodiments described above, the present invention can be changed as follows:

(1) In the embodiments described above, an example of an MO disk device as the storage device was explained, however, the embodiments can be applied as well to a magnetic disk device, optical disk drive, magnetic card device, optical card device or the like.

(2) Three types of recovery processes were explained as the recovery process, however two types or more are possible.

(3) The serious recovery process was explained as the frequency recovery process, however it could also be an intermediate recovery process.

The present invention was explained using the embodiments above, however, various changes within the range of the present invention are possible, and they should not be eliminated from the range of the present invention.

The following effects are possible with the present invention as described above:

(1) By detecting when the off track state occurs frequently, even though the servo-recovery process is performed, and executing a recovery process that corresponds to the frequency, it is possible to prevent repeatedly performing the same recovery process over a short period of time.

(2) Detection of the frequency by the program is also simple.

(3) Since the frequency of the off track condition decreases, the read/write performance of the storage device is improved.

What is claimed is:

1. A servo recovery method of a storage device, for executing a servo recovery process for restoring an on-track state of a head when said head goes off track from a track of a storage medium, comprising:
   a step of calling a servo recovery process, having a plurality of recovery processes of differing restoration levels, in correspondence to the detection of said off-track state;
   a step of detecting a calling frequency that said servo recovery process has been called up; and
   a step of selecting and executing one of said plurality of recovery processes according to said detected calling frequency.

2. A servo recovery method according to claim 1, wherein:
   said detection step comprises a step of detecting whether or not said calling frequency is higher than a specified value; and wherein
   said execution step comprises:
      a step of selecting one of said plurality of recovery processes according to the number of times said recovery process has been retried when said calling frequency is relatively low;
      a step of selecting a recovery process among said plurality of recovery processes with a comparatively complex restoration process level when said calling frequency is relatively high;
      a step of executing selected said recovery process;
      a step of updating said number of retries when restoration by said recovery process failed, and retrying selected said recovery process according to number of retries when said restoration by said selected recovery process failed; and
      a step of resetting said number of retries when restoration by said recovery process is successful.

3. A servo recovery method according to claim 1, wherein:
   said detection step comprises a step of detecting whether or not the number of times said servo recovery process has been called up within a specified time period is greater than a specified number of times.

4. A servo recovery method according to claim 1, wherein:
   said detection step comprises:
      a step of counting the number of times said servo recovery process has been called;
      a step of measuring a frequency time required for said counted number to reach a specified number; and
      a step of detecting whether or not said frequency time is greater than a specified time.

5. A servo recovery method according to claim 2, wherein:
   said selecting comprises:
      a step of selecting a recovery process with a comparatively simple restoration process level when said number of retries is relatively low; and
      a step of selecting a recovery process with a comparatively complex restoration process level when said number of retries is relatively high.

6. A servo recovery method according to claim 1, wherein:
   said step of detecting said calling frequency comprises:
      a step of detecting a first frequency of said servo recovery process; and
      a step of detecting a second frequency of said servo recovery process; and wherein
      said execution step comprises:
         a step of selecting one of said plurality of recovery processes according to said first and second frequencies.

7. A servo recovery method according to claim 1, wherein:
   said calling step comprises a step of calling a servo recovery process having a first recovery process with a simple restoration level for turning ON a servo loop for positioning said head, and a second recovery process with a complex restoration level for executing calibration of said servo loop.

8. A servo recovery method according to claim 7, wherein:
said calling step comprises a step of calling up said servo recovery process for restoring a light beam of said head to said track.

9. A storage apparatus comprises:
a head for at least reading data from a track of a storage medium;
an actuator for positioning said head on said track; and
a control circuit for controlling said actuator and executing a servo recovery process for restoring an on-track state of said head when it is detected from a signal of said head that said head has gone off track, and wherein said control circuit:
calls said servo recovery process having a plurality of recovery processes with differing restoration process levels corresponding to the detection of said off-track state;
detects the frequency that said servo recovery process has been called; and
selects and executes one of said plurality of recovery processes according to said detected frequency.

10. A storage apparatus according to claim 9, wherein:
said control circuit;
detects whether or not said calling frequency is relatively high;
selects, in correspondence to the number of times said recovery process has been retried, one of said plurality of recovery processes when said calling frequency is not relatively high;
selects from among said plurality of recovery processes a recovery process with comparatively complex restoration process level when said calling frequency is relatively high;
updates said number of retries when restoration by said recovery process failed, and retries said recovery process selected according to the number of retries; and
resets said number of retries when restoration by said recovery process is successful.

11. A storage apparatus according to claim 9, wherein:
said control circuit detects whether or not the number of times said servo recovery process has been called up within a specified time period is greater than a specified number of times.

12. A storage apparatus according to claim 9, wherein:
said control circuit;
counts the number of times said servo recovery process has been called,
measures a frequency time required for said number of call ups to reach said specified number, and
detects whether or not said frequency time is greater than a specified time.

13. A storage apparatus according to claim 10, wherein:
said control circuit;
selects a recovery process with a comparatively simple restoration process level when said number of retries is relatively low; and
selects a recovery process with a comparatively complex restoration process level when said number of retries is relatively high.

14. A storage apparatus according to claim 9, wherein:
said control circuit;
detects a first frequency of said servo recovery process; and
detects a second frequency of said servo recovery process; and
selects one of said plurality of recovery processes according to said first and second frequencies.

15. A storage apparatus according to claim 9, wherein:
said control circuit calls a servo recovery process having a first recovery process with a simple restoration level for turning ON a servo loop for positioning said head, and a second recovery process with a complex restoration level for executing calibration of said servo loop.

16. A storage apparatus according to claim 15,
wherein said head comprises an optical head for at least reading data on the track by the light beam.

* * * * *

UNITED STATES PATENT AND TRADEMARK OFFICE
CERTIFICATE OF CORRECTION

PATENT NO.      : 6,633,521 B1
DATED           : October 14, 2003
INVENTOR(S)     : Hideshi Mochizuki It is certified that error appears in the above-identified patent and that said Letters Patent is hereby corrected as shown below:

<u>Title page, Item [54] and Column 1, lines 1-2,</u>
Delete "STORAGE APPARATUS AND SERVO RECOVERY METHOD OF IT"
and insert -- METHOD FOR SELECTING AND EXECUTING A SERVO RECOVERY PROCESS BASED ON CALLING FREQUENCY OF THE RECOVERY PROCESS --.

Signed and Sealed this

Thirteenth Day of April, 2004

JON W. DUDAS
*Acting Director of the United States Patent and Trademark Office*